United States Patent
Anderson

(10) Patent No.: US 8,152,145 B2
(45) Date of Patent: Apr. 10, 2012

(54) ISOELASTIC MAGNETO-RHEOLOGICAL ELASTOMER ISOLATOR

(75) Inventor: Robert B. Anderson, Largo, FL (US)

(73) Assignee: Honeywell International Inc., Morristown, NJ (US)

( * ) Notice: Subject to any disclaimer, the term of this patent is extended or adjusted under 35 U.S.C. 154(b) by 456 days.

(21) Appl. No.: 12/432,372

(22) Filed: Apr. 29, 2009

(65) Prior Publication Data

US 2010/0276855 A1    Nov. 4, 2010

(51) Int. Cl.
F16F 6/00 (2006.01)
F16F 9/53 (2006.01)

(52) U.S. Cl. ............ 267/140.14; 267/140.15; 188/267.2
(58) Field of Classification Search ............. 267/140.14, 267/140.15; 188/267, 267.1, 267.2
See application file for complete search history.

(56) References Cited

U.S. PATENT DOCUMENTS

| | | | |
|---|---|---|---|
| 4,720,087 A * | 1/1988 | Duclos et al. | 188/267.1 |
| 4,869,476 A * | 9/1989 | Shtarkman | 188/267.1 |
| 5,064,029 A * | 11/1991 | Araki et al. | 188/267 |
| 5,492,312 A | 2/1996 | Carlson | |
| 6,622,995 B2 * | 9/2003 | Baudendistel et al. | 267/140.14 |
| 6,754,571 B2 * | 6/2004 | Gade et al. | 188/267.2 |
| 7,086,507 B2 | 8/2006 | Hitchcock et al. | |
| 7,261,834 B2 | 8/2007 | Fuchs et al. | |

FOREIGN PATENT DOCUMENTS

| | | | |
|---|---|---|---|
| JP | 59065634 A | * | 4/1984 |
| JP | 63210432 A | * | 9/1988 |
| JP | 02008528 A | * | 1/1990 |
| JP | 03186631 A | * | 8/1991 |
| JP | 2000274478 A | * | 10/2000 |

OTHER PUBLICATIONS

David York et al., A New MR Fluid-Elastomer Vibration Isolator, Journal of Intelligent Materials Systems and Structures, vol. 18, Dec. 2007, pp. 1221-1225, SAGE Publications 2007.
Memet Unsal et al., Multi-axis Semi-active Vibration Control using Magnetorheological Technology, Journal of Intelligent Material Systems and Structures, vol. 19, Dec. 2008, pp. 1463-1470, SAGE Publications 2008.

* cited by examiner

*Primary Examiner* — Thomas J Williams
(74) *Attorney, Agent, or Firm* — Fogg & Powers LLC

(57) ABSTRACT

A conically-shaped, magneto-rheologically responsive shock and vibratory isolator. The isolator includes a conically-shaped magneto-rheological elastomer component attached to opposing faces of a first and second mounting plate. Within the magneto-rheological elastomer component is a magneto-rheologically responsive fluid contained within an elastomer jacket. By its conical shape and magneto-rheological elastomeric composition, the isolator is capable of both adjusting its response to shock and vibratory disturbances of varying frequency, while maintaining an identical response along any axis (isoelasticity).

16 Claims, 6 Drawing Sheets

ISOELASTIC MAGNETO-RHEOLOGICAL ELASTOMER ISOLATOR

BACKGROUND OF THE INVENTION

Inertial Sensor Assemblies (ISAs) require mechanical isolation for protection against mechanical shock and vibration. In a typical application, an ISA is fastened to a chassis. Without isolation, shock or vibration in the chassis becomes directly transmitted to the ISA, potentially damaging or degrading the performance of the ISA.

To isolate the ISA from shock and vibration, an isolation system is used. In general, an isolation system is a mechanical isolator that physically occupies the space between the ISA and the chassis. In the simplest case, the isolation system is rubber cushions that absorb vibration or shock occurring in the chassis, preventing its transmission to the ISA.

Isolation systems are classified by the frequency range in which they provide shock or vibration protection and by how they accomplish that protection. Two general classifications are active systems and passive systems.

Passive systems are generally composed of an elastomeric material. An elastomeric material and geometry is selected based on the frequency range of the shock or vibration that the system must insulate against. A soft elastomeric material provides protection over a wider frequency range, but with the trade-off of a greater mechanical displacement of the ISA. A stiffer elastomeric material insulates only against higher frequency shock and vibration, but with the benefit of a lower displacement of the ISA in the chassis. A significant benefit of elastomeric systems is that for certain isolator geometries, the isolator can be made to act isoelastically, meaning that for a given input the isolator can provide the same frequency response, and range of frequency response, in all three axes. An isolator geometry that offers isoelastic response is a cone-like shape.

A limitation of passive systems is that the frequency band in which they provide isolation is fixed. This limits the ability of a passive isolator to provide optimal isolation to systems used in environments having shock or vibration over a wide range of frequencies. The limitation requires that a compromise be made in the frequency range over which isolation protection can be provided. It also adds complexity to ISA systems because an ISA system must be customized to the environment in which it will used simply due to the isolation protection. It would be preferable if the isolation system could be generic, instead of having to individualize the ISA systems according to their isolation system and the environment that the ISA system is going to be used.

Active systems have an advantage in that they can respond to a varying frequency of vibration or shock by changing their stiffness. U.S. Pat. No. 7,261,834 is incorporated for reference, which explains the known art of magneto-rheological isolators. By being able to optimally insulate against a wide range of frequencies, active systems overcome two limitations of passive systems: 1) a compromised range of frequency protection; and 2) the need to customize isolation systems to the environment that they are used. Active systems have a further benefit of not needing to have their frequency response of individual isolators matched to one another, as in an ISA system that used multiple passive isolators.

A limitation of active systems, though, is system complexity and the number of axes to which they can respond. Somewhat simple active isolation systems exist, but they typically respond in only one axis. Three axis active isolation systems exist, but these are generally complex, expensive, and not compact.

SUMMARY OF THE INVENTION

A mechanical isolator that is both isoelastically and magneto-rheologically responsive is disclosed. The isolator includes a conically-shaped magneto-rheological elastomer (MRE) component attached to opposing faces of a first and second mounting plate. Within the magneto-rheological component is a magneto-rheologically responsive fluid contained within an elastomer jacket. A magnetic field source is located within the vicinity of the magneto-rheological component.

As is conventional in the art, modulation of electrical power to the magnetic field source provides active control of the vibratory and shock response of the isolator. Unique to the art is the conical shape of the MRE component, which furnishes the isolator with an isoelastic response. By being equipped with both isoelastic and magneto-rheological responsiveness, the isolator is capable of providing mechanical isolation over a broad range of frequencies with identical response along any axis.

An additional benefit of the disclosed isolator is the ability for the isolator to perform passively even when the magnetic field is not applied. This ability allows there to be isolation even when system power is not applied or when system power is lost.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
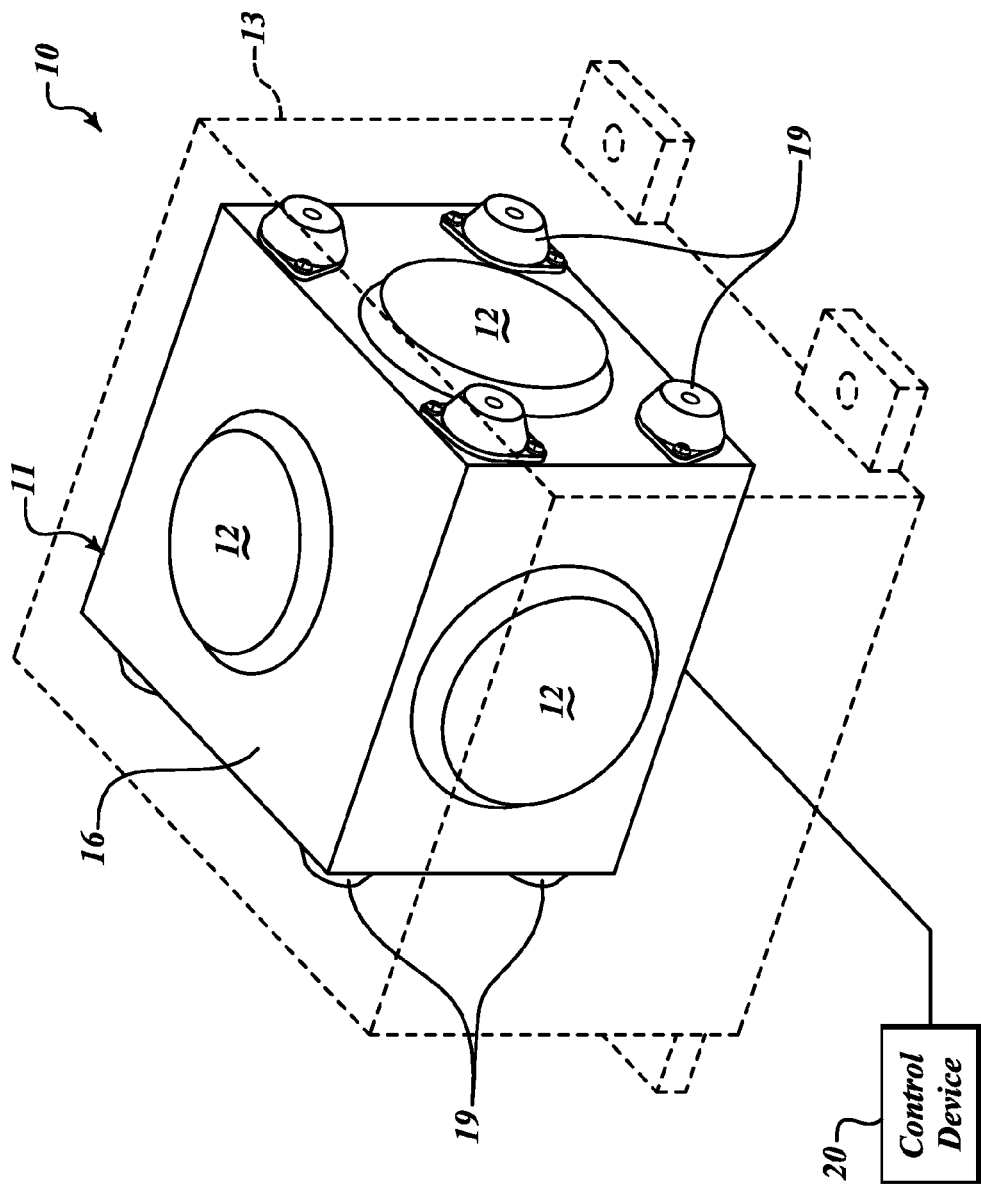
FIG. 1 is a perspective view of a navigation system containing a six inertial sensors (three visible) mounted to a processor housing, with the processor housing supported by eight magneto-rheological elastomer (MRE) isolators (seven visible)

FIG. 1 shows an x-ray perspective view of a navigation system 10. The navigation system 10 includes an inertial sensor assembly (ISA) 11 having a plurality of sensors 12 (three visible) mounted inside a chassis 13. The sensors 12 are mounted to a processor housing 16 that is connected to the chassis 13 by a set of isolators 19. Communicatively coupled with the sensors 12 and the isolators 19 is a control device 20.

In this embodiment, the inertial sensor assembly 11 includes six individual sensors (three visible), one for each axis X, Y and Z, for both acceleration and velocity measurements. Each sensor is typically rigidly fastened to the processor housing 16. Each of two opposing faces of the processor housing 16 is attached to the chassis 13 by four isolators 19. The isolators 19 protect the sensor assemblies 12 from potentially damaging mechanical shock and vibration by absorbing shock and vibration that would otherwise be transmitted from the chassis 13 to the processor housing 16, and thereby the sensors 12.

In operation, the control device 20 receives measured shock and vibration information from the sensors 12. The control device 20 determines a more optimum stiffness for the isolators 19 that more optimally isolates the transmitted shock or vibration passing through the isolators 19 from the chassis 13. The control device 20 generates and sends a command signal to the isolators 19 to adjust the more optimal stiffness. The process occurs continuously in response to shock or vibration experienced by the sensors 12.

In this embodiment, the four isolators 19 are used on two faces of the processor housing 16, but it is understood that various configurations of isolators 19 and points of attachment to the processor housing 16 are within the scope of the invention. Furthermore, the connection points of the isolators 19 need not be directly to the processor housing 16, but can be to any intermediate structure that positions the isolators 19 between the sensors 12 and the chassis 13.

Figure 2:
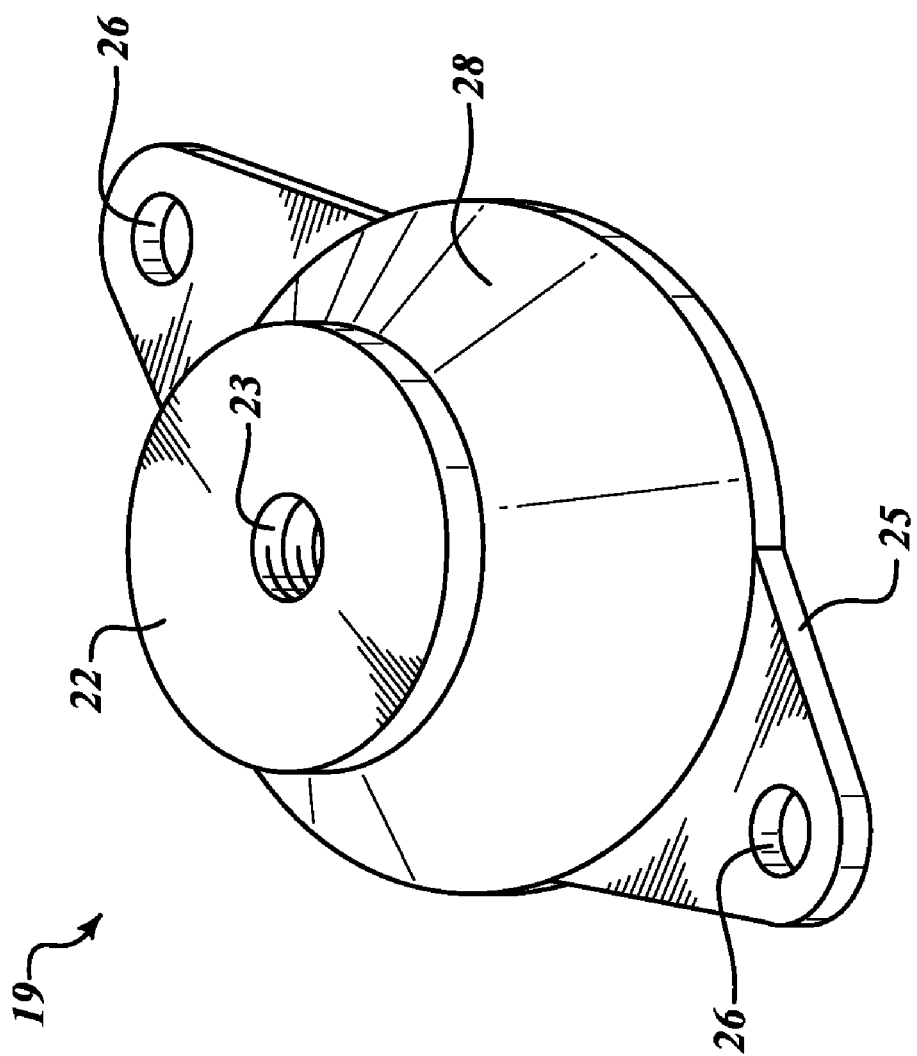
FIG. 2 is a perspective view of a first embodiment of a MRE isolator.

FIG. 2 shows a perspective view of one of the isolators 19 formed according to a first embodiment. The isolator 19 includes a first mounting plate 22, a second mounting plate 25, a magneto-rheological elastomer (MRE) component 28, a threaded receptacle 23, and two through-holes 26. The first and second mounting plates 22 and 25 are substantially parallel to one another. The first and second mounting plates 22 and 25 are also substantially rigid. Material compositions for the first and second mounting plates 22, 25 include a metal and a polymer composite material.

The MRE component 28 occupies the space between the substantially parallel first and second mounting plates 22 and 25. The MRE component 28 is affixed to one face of the first mounting plate 22 and an opposing face of the second mounting plate 25. The area of attachment of the MRE component 28 to the face of the first mounting plate 22 is smaller than the area of attachment of the MRE component 28 to the face of the second mounting plate 25. The difference in the area of attachment of the MRE component 28 on the faces of the first and second mounting plates 22 and 25 leads the MRE component 28 to be substantially cone-shaped. The conical shape furnishes the MRE component 28 with the quality of responding to laterally and longitudinally-applied vibratory and shock forces with equal stiffness.

In the embodiment of FIG. 2, the first mounting plate 22 includes a threaded receptacle 23. The threaded receptacle 23 is at the middle of the face of the first mounting plate 22, opposite the face to which the MRE component 28 is attached. The threaded receptacle 23 extends through the first mounting plate 22 into the MRE component 28. The threaded receptacle 23 provides a point to attach the isolator 19 to the chassis 13 with a threaded fastener.

Also in the embodiment of FIG. 2, the second mounting plate includes two through-holes 26. The two through-holes 26 are located outside the region to which the MRE component 28 is affixed. The two through-holes 26 extend through the entire thickness of the second mounting plate 25. The through-holes 26 provide a means for conveniently attaching the isolator 19 to the processor housing 16 with two fasteners.

Figure 3:
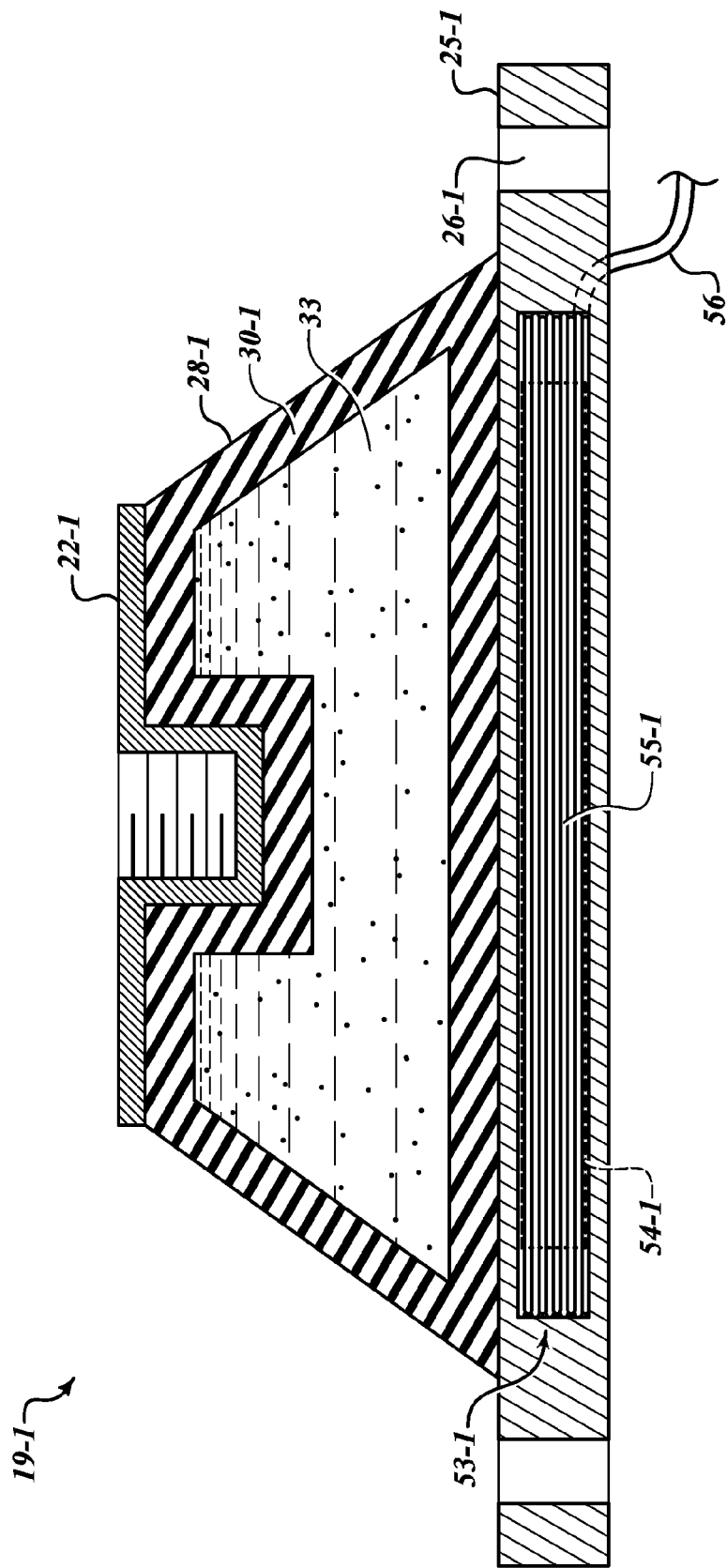
FIG. 3 is a cross-sectional view of the MRE isolator in FIG. 2.

FIG. 3 shows a cross-sectional view of one embodiment of the isolator 19 in FIG. 2. In this embodiment, an isolator 19-1 includes first and second mounting plates 22-1, 25-1 and a MRE component 28-1. The first and second mounting plates 22-1, 25-1 are mechanically coupled through the MRE component 28-1.

The boundaries of the MRE component 28-1 are defined by an elastomer jacket 30-1. Within the elastomer jacket 30-1 of the MRE component 28-1 are magnetizable particles suspended in a magneto-rheological (MR) fluid 33. Examples of the MR fluid 33 are silicone or mineral oil. Examples of materials used for the elastomer jacket 30-1 include silicone, nitrile or butyl rubber, ethylene-propylene or ethylene-acrylic copolymers, and fluorinated elastomers, among others.

The elastomer jacket 30-1 makes up the floor, ceiling and sidewalls of the conically-shaped MRE component 28-1. The floor and ceiling of MRE component 28-1 are fixed to the second and first mounting plates 25-1 and 22-1, respectively. The elastomer jacket 30-1 is adhesively or chemically bonded to the second and first mounting plates 25-1 and 22-1, respectively. The sidewalls of the MRE component 28-1 are substantially thin, 0.250" in this embodiment, providing for an interior region of the MRE component 28-1. The interior region of the MRE component 28-1 is occupied by the MR fluid 33.

At least one electromagnet 53-1 is located within the second mounting plate 25-1, below the MRE component 28-1 and between the through-holes 26-1. The electromagnet 53-1 includes a ferrite core 54-1, wire windings 55-1 and wire leads 56. The ferrite core 54-1 is a substantially planar ferrite disk. Wound around the radius of ferrite core 54-1 are the wire windings 55-1, and to the wire windings 55-1 are attached the wire leads 56.

In operation, an electric power source is connected to the wire leads 56 to provide electric power to the wire windings 55-1, causing an electric current to flow. The current induces a magnetic field around the wire windings 55-1 which is concentrated by the ferrite core 54-1 and directed through the MR fluid 33 of the MRE component 28-1. Depending on the intensity of the induced magnetic field, alignment of iron particles in the MR fluid 33 causes the stiffness, and therefore the frequency response, of the MRE component 28-1 to vary. Due to its conical shape, the adjustment in stiffness of the MRE component 28-1 is perceptible to a force felt from any direction.

Figure 4:
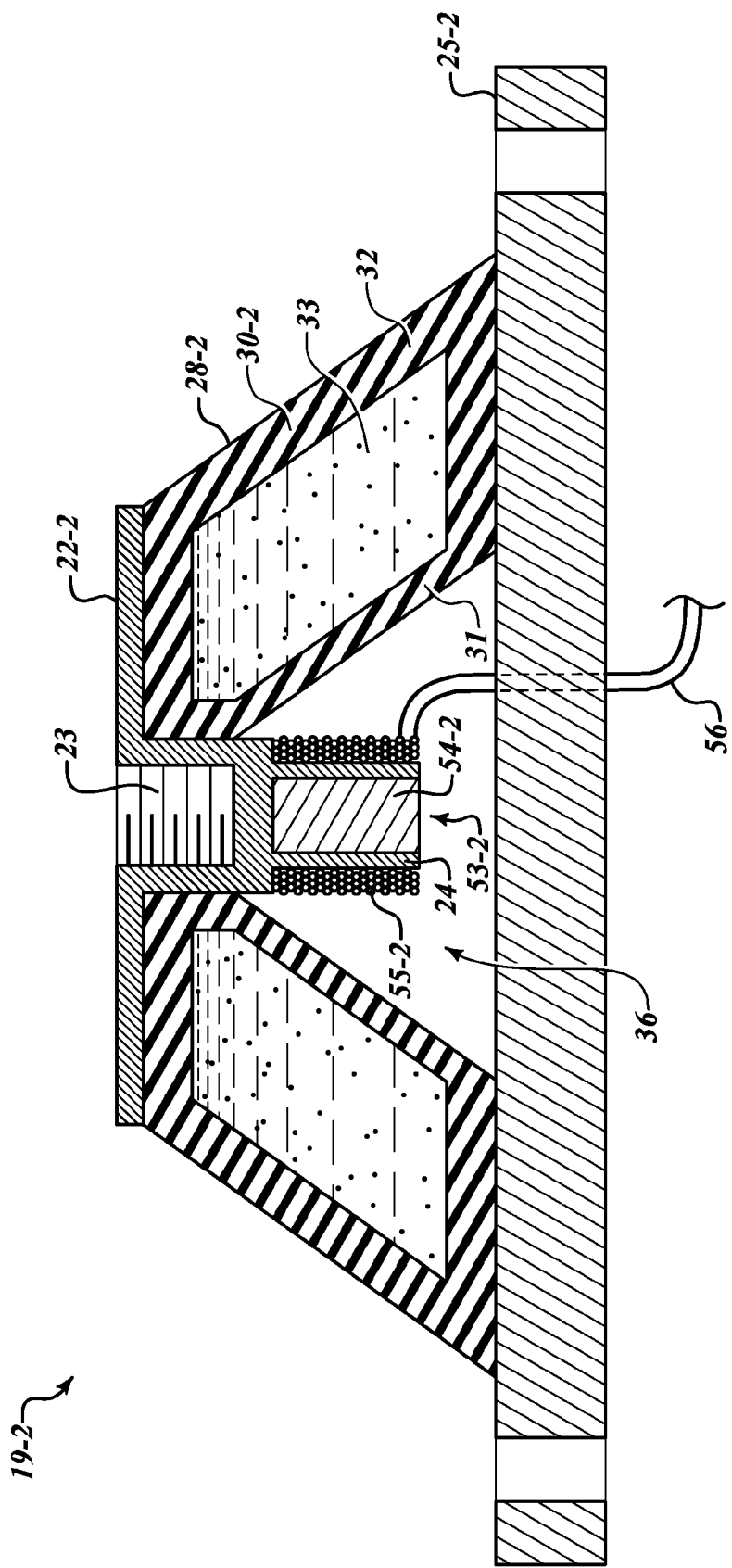
FIG. 4 is a cross-sectional view of a second embodiment of a MRE isolator.

FIG. 4 shows another cross-sectional view of one embodiment of the isolator 19 in FIG. 2. In this embodiment, an isolator 19-2 includes first and second mounting plates 22-2, 25-2 and a MRE component 28-2. Between the MRE component 28-2 and the face of the second mounting plate 25-2 exists a cavity 36. The exterior profile of the MRE component 28-2 is substantially similar to the first embodiment. But in this embodiment the interior region of the MRE component 28-2 includes the conical cavity 36, the boundary of which is defined by an inner sidewall 31 of the elastomer jacket 30-2. The inner sidewall substantially parallels an outer sidewall 32 of the elastomer jacket 30-2, and defines the boundary of the conically-shaped cavity 36. Between the inner and outer sidewall 31, 32 of the conical elastomer jacket 30-2 exists an interior region of the MRE component 28-2 that is occupied by the MR fluid 33.

Within the cavity 36 of the MRE component 28-2 is at least one electromagnet 53-2. The electromagnet 53-2 is mounted to the bottom of the first mounting plate 22-2 as an extension of the threaded receptacle 23. In this embodiment, the first mounting plate 22-2 includes a cylindrical receptacle 24 within the cavity 36. A cylindrical ferrite core 54-2 is inserted in the cylindrical receptacle 24 and held there with adhesive. Wire windings 55-2 are wrapped radially around the outside of the cylindrical receptacle 24, with the ferrite core 54-2 encased inside. Operationally, a power source is connected to the wire leads 56 connected to the wire windings 55-2, inducing a magnetic field to align iron particles in the MR fluid 33, causing the stiffness of the MRE component 28-2 to be actively adjustable and, therefore, actively respond to shock or vibration of varying frequencies. In another embodiment, the electromagnet 53-2 is mounted to the face of the second mounting plate 25-2 inside the cavity 36.

Figure 5:
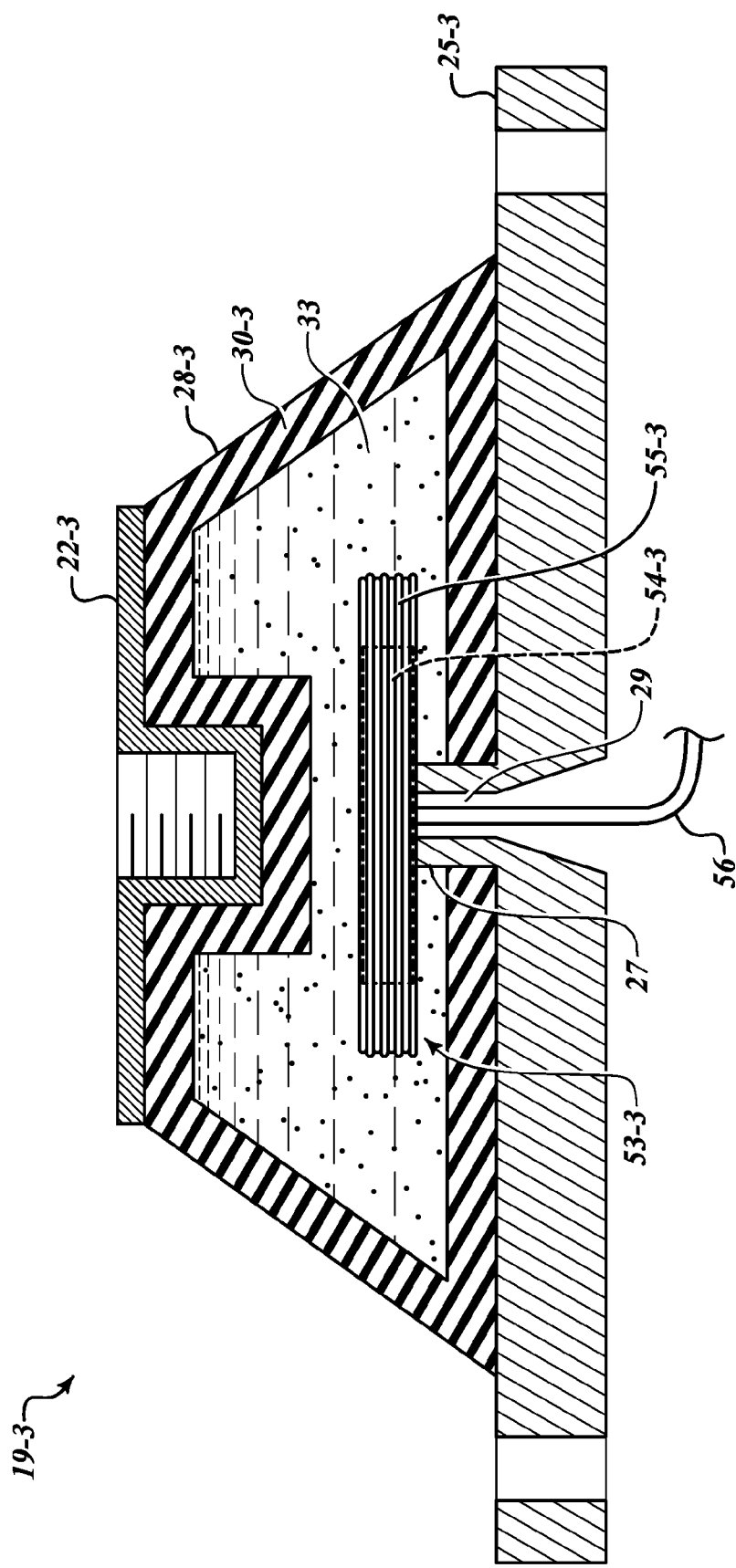
FIG. 5 is a cross-sectional view of a third embodiment of a MRE isolator.

FIG. 5 shows a cross-sectional view of a third embodiment of the isolator 19 in FIG. 2. In this embodiment, an isolator 19-3 includes first and second mounting plates 22-3, 25-3 and a MRE component 28-3. The distinguishing feature of this embodiment is that the electromagnet 53-3 is placed within the MRE component 28-3, and directly submerged within the MR fluid 33. Integrally formed with the second mounting plate 25-3 is a hollow stem 27 that penetrates the MR fluid-filled interior region of the MRE component 28-3. The electromagnet 53-3 is fastened to the stem 27 at the stem's termination in the interior region of the MRE component 28-3. To the stem 27 is attached the disk-shaped ferrite core 54-3. Wire windings 55-3 are wrapped radially around the ferrite core 54-3 and the wire leads 56 connected to the wire windings 55-3 are fed out of a hollow channel 29 in the stem 27. Operationally, a power source is connected to the wire leads 56 connected to the wire windings 55-2, inducing a magnetic field to align iron particles in the MR fluid 33, causing the stiffness of the MRE component 28-3 to be actively adjustable and, therefore, actively respond to shock or vibration of varying frequencies.

Figure 6:
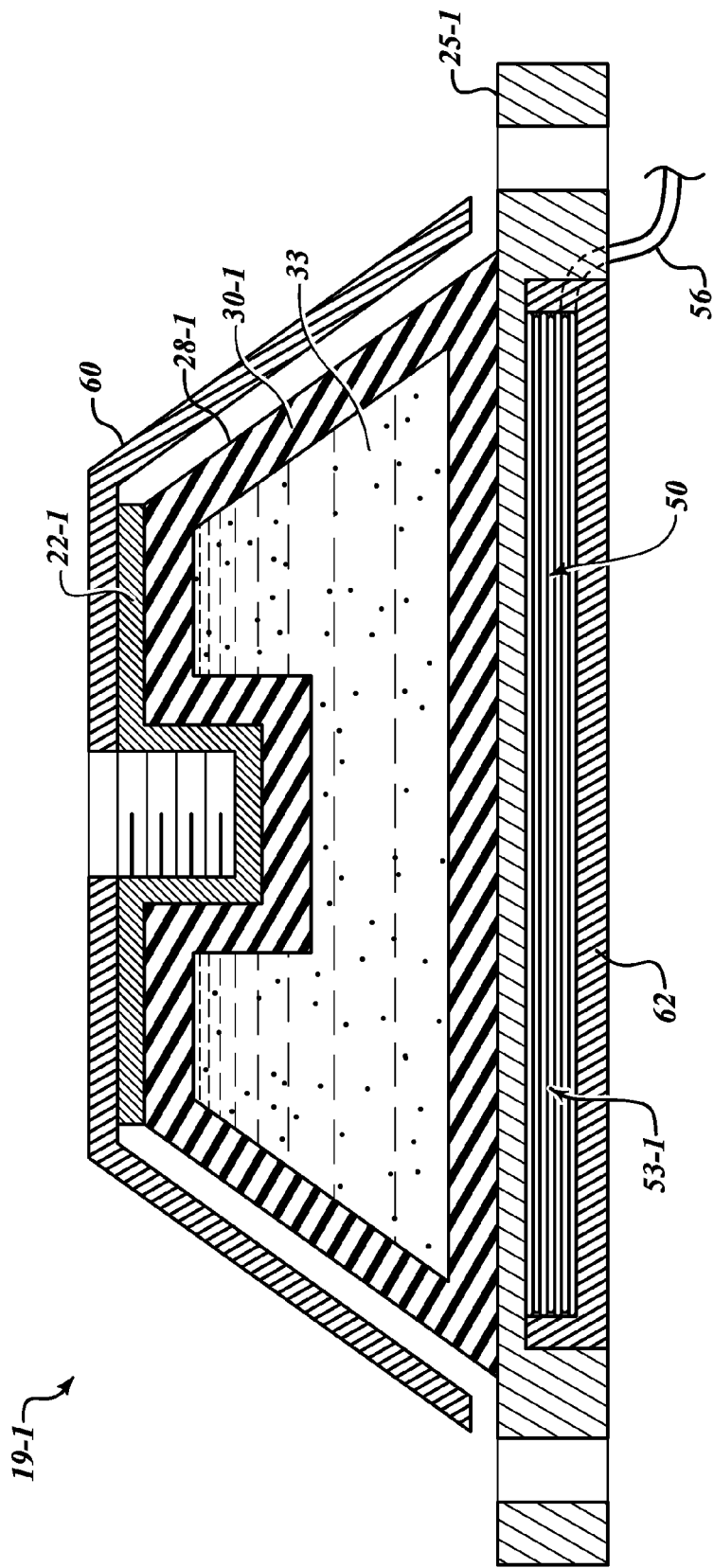
FIG. 6 is a cross-sectional view of the first embodiment of a MRE isolator in FIG. 2 with magnetic shielding.

FIG. 6 shows a further refinement applicable to any one of the three physical embodiments previously disclosed, but is shown relative the embodiment shown in FIG. 3. A top magnetic shield 60 and a bottom magnetic shield 62 are fixed to the outside of the isolator 19 to contain the induced magnetic field from magnetic field source 50 passing through MRE component 28. The purpose of the magnetic shields 60 and 62 is to absorb the magnetic field in the region surrounding the isolator 19 in order to minimize electromagnetic interference (EMI) with nearby electronics.

The bottom magnetic shield 62, made from a material composition conventional in the art of EMI shielding, is formed to fit the magnetic field source 50. Where the magnetic field source 50 is within the second mounting plate 25, the bottom magnetic shield 62 is shaped to conform to the shape of the second mounting plate 25. Where the magnetic field source 50 is within the MRE component 28, the bottom magnetic shield 62 is, at its simplest, a flat sheet affixed to the face of the second mounting plate 25, such that the second mounting plate 25 is between the bottom magnetic shield 62 and the MRE component 28.

The top magnetic shield 60, made from a material composition conventional in the art of EMI shielding, is formed to fit the combined assembly of the first mounting plate 22 and the MRE component 28. In a further refinement, the top magnetic shield 60 is relieved at its lower edge to prevent interference with the second mounting plate 25 during displacement of the isolator 19 in the presence of shock or vibration.

Considered within the scope of the invention are variants in size, shape and thickness of the top and bottom magnetic shields 60 and 62 that an expert in the art of EMI shielding would consider an obvious extension of the shield embodiment disclosed here.

While the preferred embodiment of the invention has been illustrated and described, as noted above, many changes can be made without departing from the spirit and scope of the invention. For example, the magnetic field source 50 can be implemented in any number of ways that successfully direct a magnetic field through the MR fluid 33 in the MRE component 28. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A mechanical isolator comprising:
   first and second mounting plates substantially in parallel;
   a magneto-rheological elastomer component coupled to the first and second mounting plates;
   at least one magnetic field source configured to produce a magnetic field that intersects at least a portion of the magneto-rheological component; and
   first and second magnetic shields fixed to the first and second mounting plates respectively and forming a shield around an elastomer sidewall of the elastomer component, wherein the first and second magnetic shields define a gap therebetween to allow movement of the first mounting plate with respect to the second mounting plate.

2. The mechanical isolator of claim 1, wherein the magneto-rheological elastomer component comprises an exterior jacket enclosing an interior region.

3. The magneto-rheological elastomer component of claim 2, wherein the exterior jacket is composed of an elastomer.

4. The magneto-rheological elastomer component of claim 2, wherein the interior region contains magneto-rheologically responsive fluid.

5. The mechanical isolator of claim 2, wherein a first area of attachment between the magneto-rheological elastomer component and the first mounting plate, and a second area of attachment between the magneto-rheological elastomer component and the second mounting plate, are substantially different.

6. The magneto-rheological elastomer component of claim 5, wherein the magneto-rheological elastomer component is conical.

7. The magneto-rheological elastomer component of claim 6, wherein the interior region contains magneto-rheologically responsive fluid.

8. The mechanical isolator of claim 7, wherein the magnetic field source is submerged within the magneto-rheologically responsive fluid.

9. The exterior jacket of claim 2, further comprising an inner sidewall, thereby enclosing the interior region between the inner sidewall and the exterior jacket.

10. The magneto-rheological component of claim 9, wherein the magneto-rheological elastomer component is a ring-shaped cone circling a center cavity.

11. The mechanical isolator of claim 10, wherein the magnetic field source is contained within the cavity.

12. The mechanical isolator of claim 11, wherein the magnetic field source is mounted to the first mounting plate inside the cavity.

13. The mechanical isolator of claim 1, wherein the magnetic field source is contained within the second mounting plate.

14. The mechanical isolator of claim 1, wherein the magnetic field source is an electromagnet.

15. The magnetic field source of claim 14, wherein the electromagnet includes a ferrite core, wire windings and wire leads.

16. The mechanical isolator of claim 1, wherein the first mounting plate includes a threaded receptacle and the second mounting plate includes through-holes.

* * * * *